Aug. 29, 1961 H. L. JONES 2,998,594

MAGNETIC MEMORY SYSTEM FOR TERNARY INFORMATION

Filed March 25, 1959 4 Sheets-Sheet 1

INVENTOR
HENRY L. JONES
BY Ralph R Barnard
ATTORNEY

FERRITE CELL PAIR STORING "0"

FERRITE CELL PAIR STORING "+I"

FERRITE CELL PAIR STORING "-I"

MAGNETIC MEMORY SYSTEM FOR TERNARY INFORMATION

Aug. 29, 1961 H. L. JONES 2,998,594

MAGNETIC MEMORY SYSTEM FOR TERNARY INFORMATION

Filed March 25, 1959 4 Sheets-Sheet 4

2,998,594

MAGNETIC MEMORY SYSTEM FOR TERNARY INFORMATION

Henry Lansing Jones, Endicott, N.Y., assignor to International Business Machines Corporation, New York, N.Y., a corporation of New York Filed Mar. 25, 1959, Ser. No. 801,937
8 Claims. (Cl. 340—174)

Figure 1:
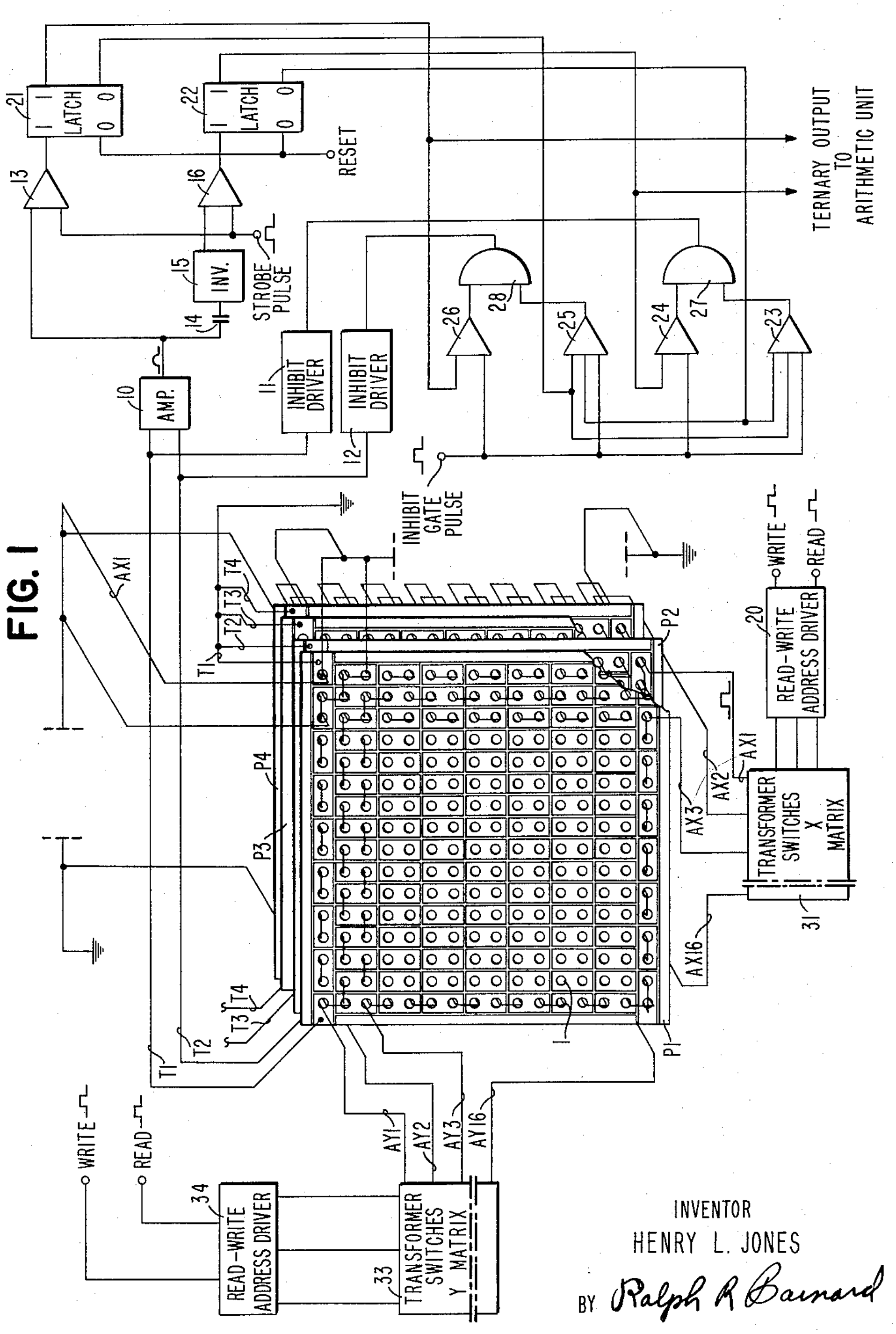

The present invention relates to means for electrically storing digital information and more particularly to a new and improved three state memory system for electrical digital information.

The two directions of magnetic remanence of a magnetic core provide two stable states which may represent a bit of digital information. The prior art has recognized these potentialities and, as a result, has utilized an array of toroidal cores, each spaced and oriented with respect to the other in accordance with rectangular coordinates for the purpose of providing a high-capacity, high-speed random access memory. Therein, the magnetic state of each toroidal core represents a bit of electrical information. An X and Y address winding is passed through each core so that the switching characteristics of the hysteresis loop of each participates during the selection of that core for purposes of writing in or reading out digital electrical information.

Recently, Radio Corporation of America developed a modified magnetic memory comprised of discrete cells of ferrite integrally formed into one solid slab (plate) with each cell having a hole or aperture passing therethrough. This structure is described in considerable detail in an article entitled "Ferrite Apertured Plate for Random Access Memory," published in the Proceedings of the IRE, page 325, volume 45. As described, a third winding serving both a sense and inhibiting function is effectively passed through each aperture of each ferrite plate by utilizing a printed circuit technique. Alternatively, when an array of cores is used, a third winding is serially threaded through the apertures of all of the cores within one plane so as to provide both the sensing and inhibit function.

This addressing system is known by those skilled in the art as a coincident current system and is applicable to both the ferrite core arrays or the ferrite aperture plates. During the writing cycle, an addressing current pulse of one polarity, having half the magnitude necessary to reversibly change the direction of the magnetic saturation of each ferrite cell or core, is selectively applied through each of the coordinate address wires of a particular cell or core. Moreover, an inhibit current pulse of the other polarity, having approximately half the magnitude necessary to reversibly change the direction of magnetic saturation, is applied to the third winding whenever it is desired that the coincidentally addressed or selected cell or core not change its state or magnetic saturation in accordance with the binary bit being written into storage.

On the other hand, during the read cycle, an addressing current pulse of the other polarity, having half the magnitude necessary to reversibly change the direction of the magnetic saturation, is coincidentally applied through each of the coordinate address wires for the selected cell or core. Any change of magnetic saturation of the ferrite cell or core is detected by a voltage being induced in the third winding. The read cycle address pulses will be in a proper polarity to change the state of saturation depending upon whether or not the ferrite cell or core was storing a bit of digital information represented by a condition of magnetic saturation which can be changed by the application of the reading address pulses.

Except where there is a coincidence of the two coordinate read or write address pulses at a particular cell or core, the read and write address pulses being applied to the coordinate address conductor have only half the magnitude necessary to change the condition of magnetic saturation for each of the cells or cores which they pass through. As a result, the half-addressed cells or cores are returned to their initial remanent condition. These flux changes cause plural incremental induced voltages in the third winding which are serially additive such that their instantaneous sum is very large compared to the desired signal voltage induced therein by the change of the coincidentally addressed cell or core from a magnetic remanent condition of a first polarity to the magnetic remanent condition of the other polarity. These unwanted induced voltages are referred to as half-address noise voltages and are the cause of a serious problem in reading the desired signal during the reading operation. To overcome this problem, the RCA publication, referred to above, describes the use of a second ferrite apertured plate adjacently positioned and identical with the first, except that the third winding of each is connected with respect to the other so that the half-address noise voltage which is generated in each will act to cancel the other; whereas, the desired signal which appears in only one of the pairs of third windings is not cancelled. Such a memory requires two ferrite apertured plates for each bit of digital word in the memory. Similarly, two plates within a ferrite core array could be used to define a bit of a digital word stored in a memory to provide the same advantages.

Since the ferrite apertured plates or core planes must be utilized in pairs for coincident current memory, two memory cells (cores), each having a positive and negative remanent condition, are available for defining each binary bit in providing a memory system for binary digital information. Copending application, Serial No. 770,667, entitled "Binary Memory System," filed October 30, 1958, Albert W. Vinal, inventor, and assigned to the same assignee as the present invention, illustrates a binary digital information memory system utilizing one of the combinations of these remanent conditions to define the two binary conditions of a bit of binary digital word.

As those skilled in the art know, the selection of the radix of a digital number system is an important factor in determining the number of components required to instrument a computer system using that radix. As stated on page 8 of a textbook entitled "Arithmetic Operations in Digital Computers," by R. K. Richards, D. Van Nostrand Company, Inc., New York, New York, 1955, it appears that the natural logarithm $\epsilon \cong 2.718$ is the best choice for a radix, all other factors being equal. Since the nearest integer is three, many have suggested that computer systems be utilized which have a radix of three.

One of the reasons why such a computing system has not been built is that an adequate electrical storage means which has three states has not been available. The above-identified copending application and the RCA publication illustrates a substantial engineering basis for using planes or plates in pairs for ferrite memories so as to provide for half-address noise voltage cancellation. Moreover, when these ferrite core planes or plates are used in pairs, a particular selection of the positive and negative remanent points of each of the two corresponding cells may be made so as to define three stable states. Furthermore, by proper instrumentation of such a ferrite memory, digital information having a radix of three may be written into and out of storage as desired.

Accordingly, it is a primary object of the present invention to provide a new and improved three state memory system for electrical digital information.

It is another object of the present invention to provide a new and improved instrumentation of a memory for a ternary digital computer system.

Other objects of the invention will be pointed out in the following description and claims and illustrated in the accompanying drawings which disclose, by way of examples, the principle of the invention and the best mode which has been contemplated of applying that principle.

Figure 2A:
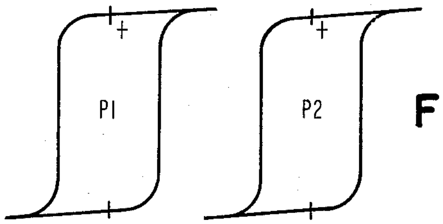
Figure 2B:
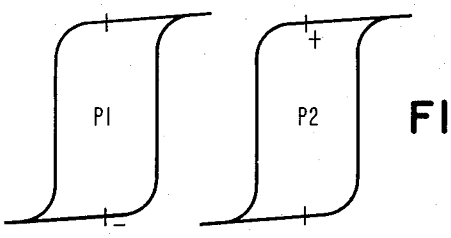
Figure 2C:
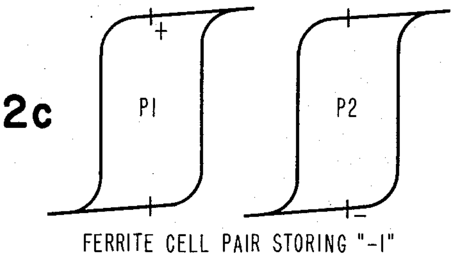
Figure 3A:
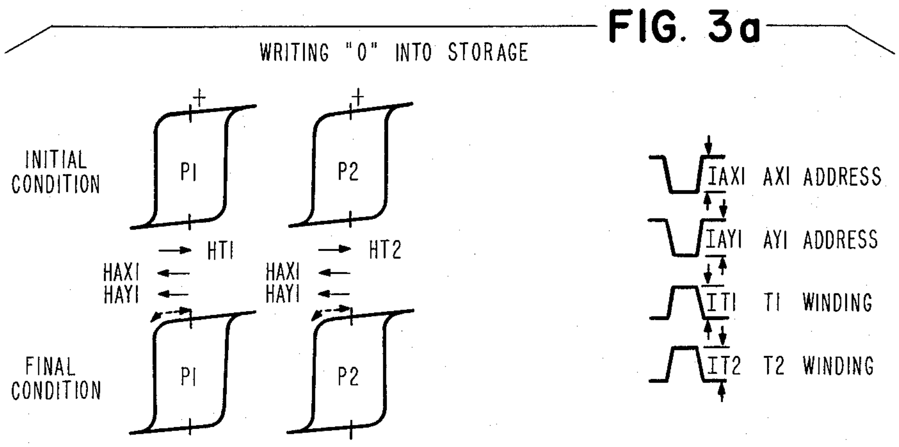
Figure 3B:
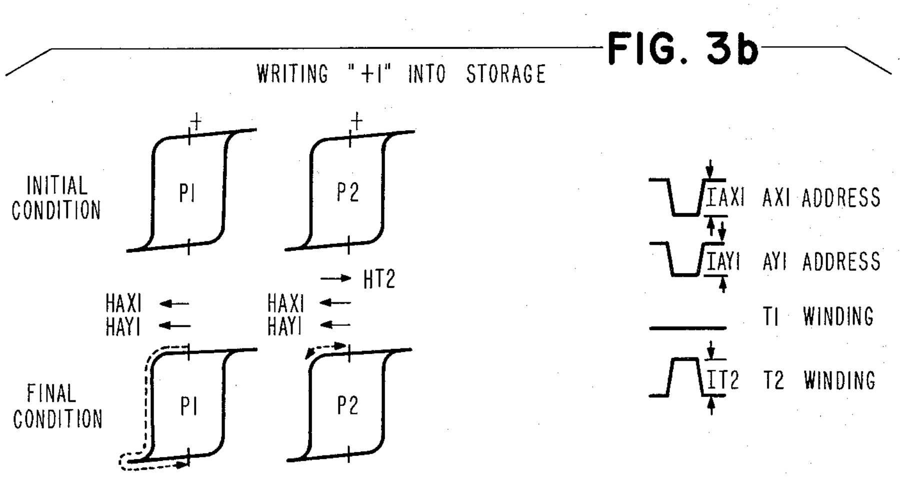
Figure 3C:
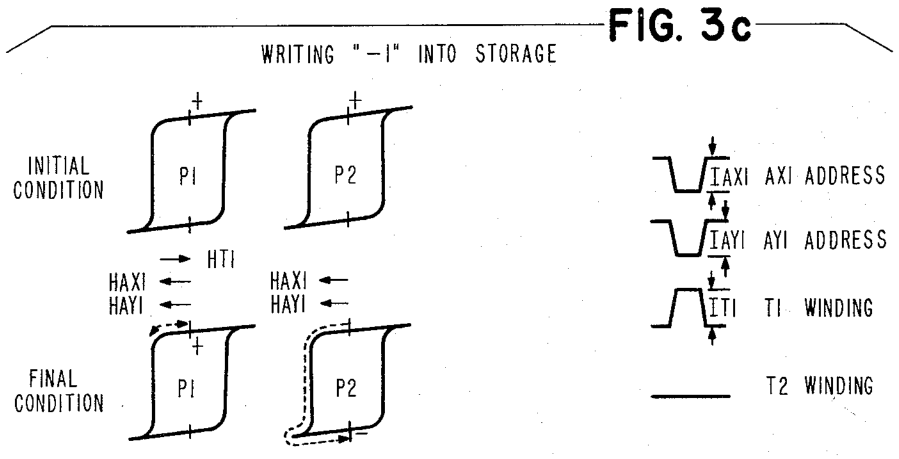
Figure 4A:
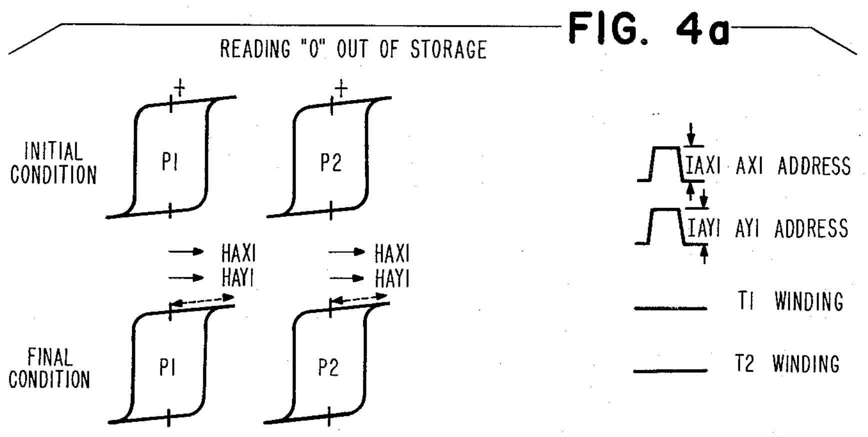
Figure 4B:
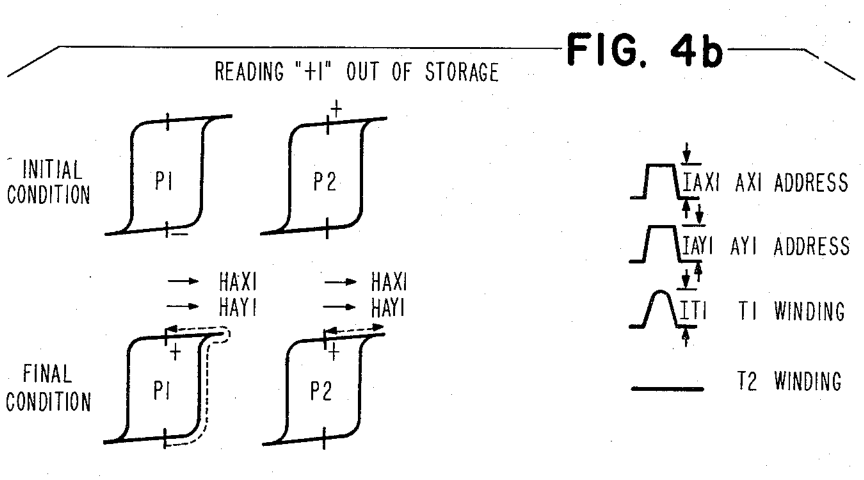
Figure 4C:
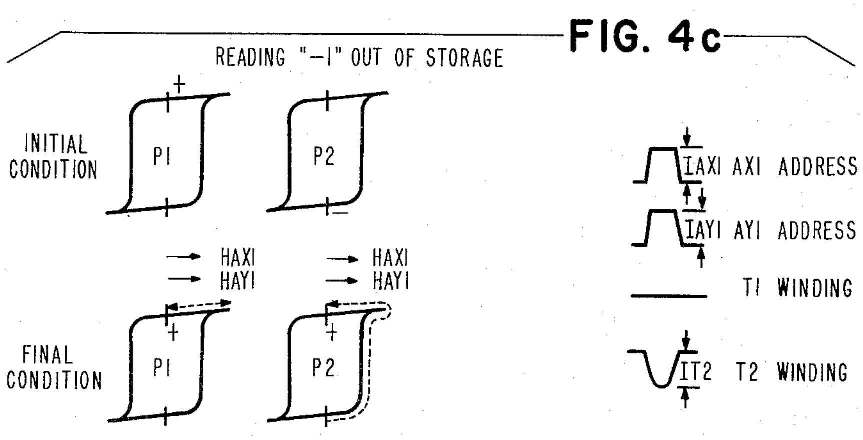

In the drawings:

FIG. 1 shows an overall schematic of a ternary digital information memory system according to the present invention;

FIGS. 2*a*, 2*b* and 2*c* show hysteresis loops showing the definition of three stable states according to the positive and negative remanent points of two magnetic memory cells according to the present invention;

FIGS. 3*a*, 3*b* and 3*c* diagrammatically show the modification of the hysteresis loops of FIGS. 2*a*, 2*b* and 2*c* during the read operation of the exemplary three state ferrite memory system; and FIGS. 4*a*, 4*b* and 4*c* diagrammatically show the modification of the hysteresis loops of FIGS. 2*a*, 2*b* and 2*c* during the write operation of the exemplary three state ferrite memory system.

Briefly described, the present invention utilizes a ferrite apertured plate or ferrite apertured core plate memory having two plates per bit in a manner such that the digital information may have a radix of three. For example, in FIG. 1, for every ferrite apertured cell 1 in plate P1, there is a corresponding ferrite apertured cell in plate P2 having the same X and Y coordinate address conductors passing therethrough. Since each of these cells have a positive and negative remanent condition, two of these cells may cooperate to define a first, second and third stable electrical condition. Referring to FIG. 2*a*, a first stable electrical condition may be defined by both of said ferrite cells being in the same magnetic remanent condition. Referring to FIG. 2*b*, a second stable electrical condition may be defined by a first cell being in the negative remanent condition and the corresponding second cell being in a positive remanent condition. Similarly, referring to FIG. 2*c*, a third stable electrical condition may be defined by the first cell being in a positive remanent condition and the corresponding second cell being in a negative remanent condition.

Referring to the details of FIG. 1, there is shown a portion of an exemplary ferrite three state memory comprising, by way of example, four ferrite apertured plates P1, P2, P3 and P4. As has been indicated, these plates cooperatively operate in pairs P1—P2 and P3—P4 to define the first and second bits of a word of ternary digital information. If it is desired to use additional bits to define a word, additional plate pairs (not shown) may be incorporated. Each of these plates P1—P2, etc. comprises individual memory units or discrete cells of ferrite integrally formed into one solid plate with each ferrite cell having an aperture 1. Each of the ferrite cells of a plate is used to cooperate with a corresponding ferrite cell in the adjacent plate so as to define a ternary bit of a different word of the digital information. The ternary digital word storage capacity of the ferrite apertured plate is then determined by the number of ferrite apertured cells contained within each plate.

Because of the nature of the plural ferrite cells surrounding each of the apertured cells 1, they may be analyzed in terms of the hysteresis loops shown in FIGS. 2*a*, 2*b*, 2*c*, etc. Therein, two reproduceable conditions are selected to correspond with the positive and negative magnetic remanent conditions of the hysteresis loop for each cell. As a result of the temporary application of a sufficiently large + magnetomotive force H to the ferrite cell, it may be placed in the positive remanent condition. Likewise, as a result of a temporary application of a sufficiently large — magnetomotive force H to the ferrite cell, it may be placed in the negative remanent condition. During the writing and reading cycles, each of these cells may be changed from one magnetic condition to the other as desired by the application of a magnetomotive force H of proper polarity as a result of coincident current pulses within the X and Y coordinate address wires passing through its aperture. However, if only one of the address conductors passing through the aperture receives a current pulse, the magnetomotive force will have insufficient magnitude to permanently modify the magnetic condition, and the cell will return to its initial condition.

Referring again to FIG. 1, each of the AX address conductors are passed through all of the ferrite apertured cells 1 having the same X coordinate. Since the apertures of plates P1, P2, having identical coordinates, are in physical registry, the address conductor is passed through all of these conductors before being threaded into the vertically adjacent apertured cells having the same identical X coordinate. Specifically, address conductor AX1 is passed directly through apertured cell 1 in the lower righthand corner of plates P1, P2, P3 and P4 from front to back and then through the vertically adjacent apertured cells 1 of plates P1, P2, P3 and P4 having an identical X coordinate from back to front. Following the same pattern, address conductor AX1 is then passed through all of the other adjacent apertured cells 1 of plates P1, P2, P3, P4, etc. until all of the apertured cells 1 having an identical X coordinate have the address conductor passed therethrough. One end of the address conductor AX1 is then connected directly to ground in parallel with all of the other AX address conductors, as shown.

In addition to these address windings, it should be noted that each plate P1, P2, etc. has a third winding of conductive material plated on top of the ferrite cells in a manner so that it is the effective equivalent of threading a winding in series with each of the apertured cells 1 of a plate. The physical detail of the winding is described in the RCA publication referred to above. As will be described in detail hereinafter, the third winding is utilized to provide an inhibit function during the write cycle or a readout sensing function during the read cycle. Similar to the AX1 address conductor, the AX2 address conductor is passed directly through the next horizontally adjacent apertured cells 1 in the lower righthand corner of plates P1, P2, P3 and P4 and then passed back through the next vertically adjacent apertured cells 1 of those plates having an identical X coordinate.

It should be noted that address conductor AX2 is initially passed from the back of the plates to the front of the plates, as distinguished from the vice versa arrangement for address conductor AX1. The reason for this requirement is that the third winding printed on each of the ferrite plates is the effective equivalent of threading a winding in series with each of the apertured cells 1 of a whole plate, thereby effectively passing the winding through each of the adjacent apertured cells 1 in a different direction. Since it is desired that a current pulse of the same polarity acting on each of the address windings AX1 and AX2 has the same effect on the respective apertured cells, the reversal of the alternate address windings becomes necessary. For this same reason, address conductor AX3 initially passes from the front of plates P1, P2, P3, P4, etc. to the back in the same manner as address conductor AX1. To avoid unnecessary circuit complication, in FIG. 1, address conductors AX4 through AX15 are not shown therein.

Similar to the X coordinate address conductors, exemplary Y coordinate address conductors are shown passing through the apertured cells 1 of each plate which are in registry and which have the same Y coordinate. For example, address conductor AY1 is shown passing through the apertures in the upper lefthand corner of plates P1, P2, P3 and P4 from front to back and then through the next horizontally adjacent apertures having the same Y coordinate from back to front, etc. Likewise, address conductor AY2 passes through the next vertically adjacent apertured cells 1 of plates P1, P2, P3 and P4 which are in registry from back to front, etc., and address conductor AY3 passes through the next vertically adjacent apertured cells 1 of plates P1, P2, P3 and P4, which are in registry from front to back, etc., in a manner similar to that shown for address conductor AY1. To avoid unnecessary circuit complications in FIG. 1, address conductors AY4 through AY15 are not shown therein. However, AY16 is shown threaded in a manner similar to address conductor AY2. As described hereinabove in reference to the AX address conductors, one terminal of each of the AY address windings is connected directly to ground in parallel with all of the other AY address conductors.

The address current pulses are derived in one of the coordinate address conductors AX1, AX2, etc. by a read-write address driver 20 through transformer switches which are in turn controlled by an addressing matrix. In FIG. 1, these matrix and transformer switches are shown in block 31. The details of the construction and operation of these components are described in the copending application identified above. During the read operation, a particular X coordinate address conductor is selected, and an address current pulse having one polarity is passed therethrough. Similarly, during the write operation, an address current pulse having the other polarity is passed thorugh a selected X coordinate address conductor.

In like manner, read-write address driver 34 selectively applies address current pulses to a particular Y address conductor AY1, AY2, etc. in cooperation with transformer switches and addressing matrix shown in block 33. The construction and operation of the read-write address driver 34 and the transformer switches and matrix shown in block 33 are also described in the above-identified copending application.

When it is desired to read out the digital information which may be stored in the ferrite cell around aperture 1 in the upper righthand corner of plates P1 through P4, coincident current pulses are applied through address conductors AY1 and AX1 so as to provide the necessary magnitude of magnetomotive force to cause the magnetic condition of the ferrite cell to change from a + remanent condition to a − remanent condition, or vice versa, depending upon the polarity of the address currents and the nature of the digital information stored therein. If there is a change of magnetic condition from one remanent condition to the other, this flux change induces a voltage in the third winding of each plate which is representative of the stored digital condition being read out. While the apertured cells 1 in the upper righthand corner of each plate receives a magnetomotive force H of sufficient magnitude to change the magnetic condition of the ferrite cell, this is not true of the other ferrite cells having only the AX1 coordinate or the AY1 coordinate, since only half the magnetomotive force which is necessary to change the magnetic condition of the cell is available. While the magnetic condition of these ferrite cells is not changed by the address current pulse, each cell experiences a flux change therein prior to the magnetic condition of that cell returning to its initial remanent condition. This results in a voltage being induced in the third winding by each of these half-addressed ferrite cells which will be described hereinafter as half-select address voltage. Inasmuch as the third winding for each plate is passed in series through the apertured cells 1 of each of these cells within each plate, the half-address voltages generated in each half-address cell are additive, and a very large total half-address voltage is induced in the third winding of each plate.

For example, considering plate P1 which has 16 ferrite cells along each coordinate, 15 ferrite cells along the X coordinate are half-addressed and 15 ferrite cells along the Y coordinate are half-addressed with only one ferrite cell being coincidentally addressed such that it may produce a readout induced voltage commensurate with the flux change between its two remanent conditions. As one skilled in the art will recognize, the half-address induced voltages are likely to be many times greater than the desired readout signal, thereby rendering the induced voltage commensurate with the digital condition readout unrecognizable. In order to overcome this shortcoming, the prior art, as set forth in the RCA publication identified hereinabove, teaches the use of two ferrite plates as a pair with the printed third windings exemplified by T1 and T2 of plates P1 and P2, respectively, connected in an electrically opposed relationship so that the half-address voltages induced in one cancels the half-select voltages induced in the other with smaller readout induced voltages remaining. For this purpose, FIG. 1 shows one terminal of third windings T1 and T2 commoned and connected to ground, while the other terminal of each is connected to a differential amplifier 10 which will derive an output voltage commensurate with the instantaneous difference between the voltages induced in each of these third windings. This output voltage from differential amplifier 10 will be commensurate with the digital information which had been stored in the addressed ferrite apertured cell. Differential amplifier 10 may be one of several known types or of a construction as one described in copending application, Serial No. 745,630, filed June 30, 1958, entitled "Common Mode Feedback Circuits," Richard W. Jones, inventor, and assigned to the same assignee as the present application.

Under these conditions, both ferrite apertured plates P1 and P2 may be utilized to define the ternary digital conditions representing a "0" "+1" and "−1" which it is desired to store in the memory. One representative method of finding these ternary digital conditions is shown in FIGS. *2a, 2b and 2c*. FIG. *2a* shows two hysteresis loops representing the magnetic conditions of ferrite apertured cells having identical AX and AY coordinates on plates P1 and P2 when the pair is defined as storing "0." Therein by definition, a "0" is stored when both of the ferrite cells of P1 and P2 are in a positive remanent condition.

Similarly, FIG. *2b* shows two hysteresis loops representing the magnetic conditions of ferrite apertured cells having an identical AX and AY coordinate on plates P1 and P2 when the pair is storing a "+1". By definition, a "+1" is stored therein when the ferrite apertured cell of plate P1 is at its negative remanent condition, while the corresponding ferrite apertured cell of P2 is in its positive remanent condition.

Finally, FIG. *2c* shows two hysteresis loops representing the magnetic conditions of ferrite apertured cells having identical AX and AY coordinates on plates P1 and P2 when the pair is storing a "−1". By definition, a "−1" is stored therein when the ferrite apertured cell of plate P1 is in its positive remanent condition, while the corresponding ferrite apertured cell of plate P2 is in its negative remanent condition. In addition, based on this method for defining the ternary conditions as set forth in FIGS. *2a, 2b* and *2c*, each ferrite apertured cell of a pair has the initial condition of being at a positive remanent condition on its hysteresis loop prior to the insertion of ternary information into the memory and/or immediately after ternary information has been read out.

Assuming this mode of operation, FIG. *3a* symbolically illustrates the writing of a "0" into storage, FIG. *3b* symbolically illustrates the writing of a "+1" into storage and FIG. *3c* symbolically illustrates the writing of a "−1" into storage. In like manner, FIG. *4a* symbolically illustrates the reading of a "0" out of storage, FIG. *4b* symbolically illustrates the reading of a "+1" out of storage and FIG. *4c* symbolically illustrates the reading of a "−1" out of storage.

Considering by way of example, that it is desired to write a "0" into the ferrite apertured cell pair at the upper righthand corner of plates P1 and P2, FIG. *3a* shows a hysteresis loop for each ferrite cell of the pair identified as P1 and P2 representing both the initial magnetic conditions and the final magnetic conditions. In FIG. 3*a*, it should be noted that both the ferrite apertured cells are initially in the positive remanent condition. Furthermore, when each of the ferrite apertured cells is coincidentally addressed by passing the negative going current pulses IAX1 and IAY1, depicted in FIG. 3*a* through address conductors AX1 and AY1, respectively, each of the addressed ferrite cells P1 and P2 receives two magnetomotive forces represented by vectors HAX1 and HAY1, each having the magnitude necessary to drive the ferrite apertured cells P1 and P2 to their negative remanent condition.

Thus, the coincident address pulses would act to change the magnetic condition of both the selected cells P1 and P2 except for the fact that, when it is desired to write a "0" into the selected pair, the third winding T1 of plate P1 and the third winding T2 of plate P2 are also pulsed by inhibit drivers 11 and 12, respectively. In a manner which will be described hereinafter, as shown, these inhibit current pulses identified as IT1 and IT2 derive magnetomotive forces HT1 and HT2, respectively, which are equal and opposite to either HAX1 or HAY1 such that the needed magnetomotive force acting on the selected cell of each P1 and P2 is not sufficient to change their magnetic condition. As a result, the magnetic condition of the selected cells of P1 and P2 remains in the condition illustrated in FIG. 2*a* as representing a ternary "0" condition.

Similarly, when it is desired to write a "+1" into the ferrite apertured cell pair at the upper righthand corner of plates P1 and P2, FIG. 3*b* shows a hysteresis loop for each ferrite cell of the pair representing both the initial and final magnetic conditions. As in FIG. 3*a*, both of the ferrite cells of P1 and P2 are initially in the positive remanent condition. When each of the ferrite apertured cells is coincidentally addressed by negative going current pulses, two magnetomotive forces represented by vectors HAX1 and HAY1, are supplied to drive the selected ferrite apertured cell of P1 and P2. Moreover, these magnetomotive forces have sufficient total magnitude to drive each cell into its negative remanent condition. However, if the third winding T2 of plate P2 is also pulsed by inhibit driver 12, a magnetomotive force HT2 is produced which is equal and opposite to either HAX1 or HAY1 acting on the selected cell of P2 so that it will not change its magnetic condition. On the other hand, the addressing magnetomotive forces HAX1 and HAY1 will be sufficient to drive the selected ferrite apertured cell of P1 to its magnetic remanent condition and the final condition of cell pair, as shown in FIG. 3*b*. It should be noted that the final condition of FIG. 3*b* is identical with FIG. 2*b* representing a ternary "+1" condition.

Furthermore, when it is desired to write a "—1" into the ferrite apertured cell pair at the upper righthand corner of plates P1 and P2, FIG. 3*c* shows a hysteresis loop for each ferrite cell of the pair representing both the initial and final magnetic conditions. As in FIG. 3*a*, both the ferrite cells of P1 and P2 are initially in the positive remanent condition. When each of the ferrite apertured cells is coincidentally addressed by negative going current pulses IAX1 and IAY1, two magnetomotive forces represented by vectors HAX1 and HAY1 are supplied to the selected ferrite apertured cells P1 and P2 having sufficient total magnitude to drive each cell to its negative remanent condition. However, if the third winding T1 of plate P1 is also pulsed by inhibit driver, a magnetomotive force HT1 is produced which is equal and opposite to either HAX1 or HAY1 acting on the selected cell of P1 so that it will not change its magnetic condition. On the other hand, the addressing magnetomotive forces HAX1 and HAY1 will be sufficient to drive the selected ferrite apertured cells of P2 to its "—" remanent condition, and the final condition of the cell pair shown in FIG. 3*c* will be identical with FIG. 2*c* representing a "—1" in storage.

When it is desired to read the binary information stored in the ferrite apertured plate memory, the appropriate ferrite apertured cell of each plate is selected by coincident current pulses except that the address current pulses have an opposite polarity. By way of example, consider that the ferrite apertured cell in the upper righthand corner of plates P1 and P2 is storing a "0" and it is desired to read this "0" out. FIG. 4*a* shows a hysteresis loop for each ferrite cell of the pair (P1 and P2) having an initial magnetic condition corresponding to a ternary "0" with the selected cell in plates P1 and P2 being in its positive remanent condition. It should be noted that this initial condition corresponds to FIG. 2*a*. During the reading operation, when each of the selected cell pairs is coincidentally addressed by passing the positive going current pulses IAX1 and IAY1, depicted in FIG. 4*a*, through address conductors AX1 and AY1, respectively (FIG. 1), each of the selected cells receives two magnetomotive forces represented by vectors HAX1 and HAY1. Since both of the selected cells are already in the "+" remanent condition, these positive going magnetomotive forces are ineffective to change the magnetic condition of each cell. As a result, no net signal voltage is induced in the output of differential amplifier 10 by third windings T1 and T2.

When the ferrite apertured cell pair at the upper righthand corner of plates P1 and P2 have a magnetic condition corresponding to storing a ternary "+1," as represented by the initial condition of the two hysteresis loops of FIG. 5*b*, this information may be read by coincidentally passing the positive going current pulses IAX1 and IAY1, depicted in FIG. 4*b*, through address conductors AX1 and AY1, respectively (FIG. 1). As a result of these address current pulses, both of the selected cells of plates P1 and P2 receive two magnetomotive forces represented by vectors HAX1 and HAY1, each having half the magnitude necessary to drive the selected cells of P1 and P2 to their "+" remanent condition. However, since the selected cell of P2 is already in a "+1" remanent condition, the coincident current address pulses are effective to drive only the selected cell of plate P1 to that condition. This change is shown by the final condition in FIG. 4*b*. The change of magnetic condition of the selected cell of plate P1 acts to induce a voltage in third winding T1, while a similar voltage is not induced in third winding T2 because the selected cell of plate P2 does not undergo the same degree of change of magnetic condition.

As a result, differential amplifier 10 has a voltage applied thereto via one input from third winding T1 commensurate with the total half-address noise voltage referred to hereinabove plus the desired signal, while third winding T2 applies a similar half-address noise voltage to the other input thereof. Differential amplifier 10 takes the difference of these inputs such that a positive going voltage pulse is developed at its output terminal.

One method of using this readout ternary information commensurate with a "+1" is to convert the positive voltage pulse to a positive computer logic pulse of a specific pulse width and amplitude. This requirement is complicated by the fact that the half-address noise voltage cancellation obtained as described hereinabove may not be completely optimum, and the leading edge of the readout pulse may still contain a very large amplitude noise voltage so that the existence of the desired signal will be hard to detect. Therefore, means must be provided to substantially reject the large noise voltage and select only the desired signal voltage, while at the same time deriving a positive computer logic pulse to represent a ternary "+1" condition. Such means may be one of several types exemplified by a stretch amplifier 13, the details of which are described in copending application, Serial No. 757,803, filed August 28, 1958, entitled "Electronic Detection and Amplification Means," Albert W. Vinal, inventor, and assigned to the same assignee as the present application. Since the circuit details of this stretch amplifier are not a part of the present invention, it will not be described herein in detail.

The positive going logic pulse derived in the output of the stretch amplifier 13, in response to the reading out of a ternary "+1" condition, is applied to the one input terminal of buffer storage latch 21. Latch 21 is of conventional construction with the two input terminals labelled 1 and 0 and two output terminals labelled 1 and 0. A latch conventionally has two operational states: a reset condition and a set condition. Considering positive logic, a latch originally in the reset condition will drive its one output terminal from a reference voltage level in a positive to an up level in response to a positive voltage pulse input to its one input terminal. Correspondingly, the zero output terminal of the latch goes to the reference voltage level (down voltage level). The latch is then in what is defined as its set condition. Moreover, the conventional latch circuit may be driven back to its reset condition only by the application of a positive voltage pulse to its zero input terminal so that the zero output terminal goes to an up voltage level and the one output terminal goes to the down voltage level. It is emphasized that when the one output terminal is at an up voltage level, the zero output terminal must be in its down voltage level and vice versa. Accordingly, as a result of the application of a positive going pulse to latch 21, representing a ternary "+1" condition, its one output terminal goes to an up voltage level. Meanwhile, the one output terminal of latch 22 remains at a down voltage level.

When the ferrite apertured cells at the upper right-hand corner of plates P1 and P2 are storing a magnetic condition corresponding to a ternary "−1" as represented by the initial condition of the two hysteresis loops of FIG. *4c*, this information may be read by coincidentally passing positive going address current pulses IAX1 and IAY1, depicted in FIG. *4c*, through address conductors AX1 and AY1, respectively (FIG. 1). As a result of these address current pulses, both of the selected cells of plates P1 and P2 receive two magnetomotive forces represented by vectors HAX1 and HAY1, each having half the magnitude necessary to drive the selected cells of P1 and P2 to their positive remanent condition. However, since the selected cell of P1 is already in the "+1" magnetic remanent condition, the coincident address current pulses are effective to drive only the selected cell of plate P2 to that condition. This change is shown in the final condition in FIG. *4c*.

The change of magentic condition of the selected cell of plate P2 acts to induce a voltage in third winding T2, while a similar voltage is not induced in third winding T1 because the selected cell of plate P1 does not undergo the same degree of change of magnetic condition. As a result, differential amplifier 10 has a voltage applied thereto via one input from third winding T2 commensurate with the total half-address voltage referred to hereinabove plus the desired signal, and third winding T1 applies a similar half-address noise voltage to the other input thereof. Differential amplifier 10 takes the difference of these inputs such that a negative going voltage pulse is developed at its output terminal.

One method of using this readout ternary information commensurate with a "−1" is to convert the negative going voltage pulse to a positive computer logic pulse of a specific pulse width and amplitude. As in the case of reading out a "+1", this requirement is complicated by the fact that the half-address cancellation obtained as described hereinabove may not be completely optimum, and the leading edge of the output pulse may contain a very large amplitude noise such that the existence of the desired signal may be hard to detect. As a result, the output from differential amplifier 10 is applied through a capacitor 14 and conventional inverter 15 to a stretch amplifier 16. When a properly timed strobing pulse is applied to stretch amplifier 16 from a conventional timing source in coincidence with the inverted voltage pulse commensurate with a ternary "−1" condition being read out of the coincidentally addressed apertured cell pair, a positive going logic pulse is derived in its output. This positive going logic pulse is applied to a conventional latch 22 to drive it to its set condition and raise its one output terminal to an up level.

In summary, latches 21 and 22 are identical except that the former is driven to a set condition on the reading out of a ternary "+1," and the latter is driven to its set condition on the reading out of a ternary "−1". Moreover, neither latch is driven to its set condition on the reading out of a ternary "0". Thus, as shown by the arrows in FIG. 1, the one output terminal of each of the latches 21 and 22 may be utilized to provide inputs to the arithmetic unit of the ternary computer system.

Because the reading of the ternary condition of any of the apertured cell pairs necessitates the destruction of the defined magnetic conditions therein, each reading operation must be followed by a writing operation. Accordingly, latches 21 and 22 are connected through AND circuits 23, 24, 25 and 26 and OR circuits 27 and 28 to appropriately operate inhibit drivers 11 and 12 in response to an appropriately timed inhibit gate pulse during the writing operation. Considering positive logic, the conventional AND circuits 23, 24, 25 and 26 will have a high voltage level at their output when each of their inputs are at a high voltage level. In contrast, the OR circuits 27 and 28 will have a high voltage level at their output when either one of their inputs is at a high voltage level. Drivers 11 and 12 may be of conventional circuitry exemplified by a transistorized emitter-follower driving a transformer switch connected in a common emitter configuration between cut-off and saturation.

If, during the reading operation, the coincidentally addressed apertured cell pair derives a positive going pulse in the output of differential amplifier 10 commensurate with a ternary "+1" condition stored therein, latch 21 is driven to its set condition. Then, during the succeeding write operation and on the occurrence of a positive inhibit gate pulse, both of the inputs to AND circuit 26 are in their up level so as to cause inhibit driver 12 to pulse third winding T2 of plate P2 with current pulse IT2 in the manner shown in FIG. 3*b*. Meanwhile, the apertured cell pair which was just read is again coincidentally addressed with the negative going address pulses also shown in FIG. 3*b*. While a ternary "+1" condition is being written, one of the inputs to AND circuits 23, 24 and 25 is at its down level.

If, during the reading operation, the coincidentally addressed apertured cell pair derives a negative going pulse in the output of differential amplifier 10 commensurate with a ternary "−1" condition stored therein, latch 22 is driven to its set condition through capacitor 14 and inverter 15. Then, during the succeeding write operation and on the occurrence of a positive inhibit gate pulse, both the inputs to AND circuit 24 are in the up level so as to cause inhibit driver 12 to pulse third winding T1 to plate P1 with a current pulse IT1 in the manner shown in FIG. 3*b*. Meanwhile, the apertured cell pair which was just read is again coincidentally addressed with the negative going address pulses also shown in FIG. 3*c*. While a ternary "−1" condition is being written, one of the inputs to AND circuits 23, 25 and 26 is in its down level.

If, during the reading operation, the coincidentally addressed apertured cell pair fails to derive any desired signal in the output of differential amplifier 10 commensurate with a ternary "0" condition stored therein, neither latches 21 or 22 receives an input, and they remain in their set condition. Then, during the write operation and on the occurrence of a positive inhibit gate pulse, the three inputs to AND circuits 23 and 25 are in their up level so as to cause both inhibit drivers 11 and 12 to pulse third windings T1 and T2 with current pulses IT1 and IT2 in the manner shown in FIG. 3*a*. Meanwhile, the apertured cell pair which was just read is again coincidentally addressed with the negative going addressed pulses as shown in FIG. 3*a*. When a ternary "0" condition is being written, one of the inputs to AND circuits 24 and 26 is in its down level. For the operation as described hereinabove, latches 21 and 22 must receive a reset pulse following each successive read and write operation so that they may be in proper condition to record the ternary digital information being read out.

As described hereinabove, information is read from a fully addressed apertured cell pair during the reading operation and written back in a selected apertured cell pair during the succeeding writing time. This ternary information may be written back in the same apertured cell pair from which it was read or any of the other apertured cell pairs by appropriately addressing the memory during the writing operation. Sometimes, it may be desired to write new information into the ternary memory system. When this is desired, an appropriate positive going logic pulse may be applied to the one input terminal of either latches 21 or 22 during the reading operation and at the same time failing to apply a strobing pulse to either of stretch amplifiers 13 and 16. Accordingly, latches 21 and 22 will have a condition commensurate with the new ternary digital bit which it is desired to write into storage during the succeeding writing operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. One of the many modifications which may be made within the scope of the present invention would be to modify the definitions of the ternary digital conditions as set forth in FIGS. 2*a*, 2*b* and 2*c*. For example, the ternary conditions could be defined by any combination of the conditions shown therein. Moreover, the devices used to provide the instrumentation of the ferrite memory shown in FIG. 1 may vary according to the particular requirement of the electrical design in any practical embodiment.

What is claimed is:

1. A ferrite memory for ternary digital information comprising two ferrite apertured cells for each bit of ternary digital information, each of said cells having a plus magnetic remanent condition and a minus magnetic remanent condition, each pair being utilized to define a ternary bit of the digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition.

2. A ferrite memory for ternary digital information comprising plural apertured ferrite cells arranged in pairs of a first and second cell having their apertures in axial registry, each pair being utilized to define a bit of the digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition.

3. A ferrite memory for ternary digital information comprising two ferrite apertured cells for each bit of ternary digital information, each of said cells having a plus magnetic remanent condition and a minus magnetic remanent condition, each pair being utilized to define a bit of the digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition, electrical addressing means for applying sufficient magnetomotive force simultaneously to said first and second cells to change each cell from one magnetic remanent condition to another during a reading and writing operation, said addressing magnetomotive force having one polarity during the reading operation and the other polarity during the writing operation, means for selectively inhibiting the change of magnetic remanent condition of said cells during the writing operation and means for sensing the change of magnetic remanent condition in said cells during the reading operation.

4. A ferrite memory for a digital computer system comprising a plurality of apertured ferrite cells each having a positive and negative remanent condition, said apertured ferrite cells being physically supported in a plurality of planes, said cells within a plane being arranged to form a grid so that each cell may be identified according to Cartesian X and Y coordinates, said cells relating to a particular word being in physical registry and identified by the same Cartesian X and Y coordinates, the number of planes of discrete ferrite cells being determined by the number of bits in the digital word being stored, said planes of discrete cells cooperating as a pair so that the first and second discrete cell having the same Cartesian X and Y coordinate can be utilized to define a bit of a digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition.

5. A ferrite memory for a digital computer system comprising a plurality of apertured ferrite cells each having a positive and negative remanent condition, said apertured ferrite cells being physically supported in a plurality of planes, said cells within a plane being arranged to form a grid so that each cell may be identified according to Cartesian X and Y coordinates, said cells relating to a particular word being in physical registry and identified by the same Cartesian X and Y coordinates, the number of planes of discrete ferrite cells being determined by the number of bits in the digital word being stored, said planes of discrete cells cooperating as a pair so that the first and second discrete cell having the same Cartesian X and Y coordinate can be utilized to define a bit of a digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition, plural X address conductors each passing serially through the aperture of each cell having an identical X coordinate, plural Y address conductors each passing serially through the aperture of each cell having an identical Y coordinate.

6. A ferrite memory for a digital computer system comprising two ferrite apertured plates for each bit of a digital word of information which it is desired to store in said memory, each of said apertured plates comprising a plurality of discrete ferrite cells having an aperture therein arranged to form a grid so that each aperture may be identified according to Cartesian X and Y coordinates, said apertures relating to a particular digital word being in physical registry and identified by the same Cartesian X and Y coordinates, plural X address conductors each passing serially through all of the apertures having an identical X coordinate, plural Y address conductors each passing serially through all of the apertures having an identical Y coordinate, a first and second discrete ferrite cell having the same Cartesian X and Y coordinates within said two plates being utilized to define a first, second and third stable electrical condition, said first stable condition being defined by both of said first and second ferrite apertured cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition.

7. A ferrite memory for a digital computer system comprising a plurality of apertured ferrite cells each having a positive and negative remanent condition, said apertured ferrite cells being physically supported in a plurality of planes, said cells within a plane being arranged to form a grid so that each cell may be identified according to Cartesian X and Y coordinates, said cells relating to a particular word being in physical registry and identified by the same Cartesian X and Y coordinates, the number of planes of discrete ferrite cells being determined by the number of bits in the digital word being stored, said planes of discrete cells cooperating as a pair so that the first and second discrete cell having the same Cartesian X and Y coordinate can be utilized to define a bit of a digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition, the discrete cells of each plate having a third winding passing serially therethrough so as to provide a sensing function during the reading operation and an inhibit function during the writing operation, means for simultaneously addressing the cell of each of the plates having the same selected Cartesian X and Y coordinates by applying a magnetomotive force of a first polarity during the reading operation and a second polarity during the writing operation, said third winding of each pair of plates coacting during the reading operation to cancel half-addressed voltage disturbances.

8. A ferrite memory for ternary digital information comprising plural apertured ferrite cells arranged in pairs of a first and second cell having their apertures in axial registry, each pair being utilized to define a bit of the digital word by having a first, second and third stable electrical condition, said first stable electrical condition being defined by both of said ferrite cells being in the same magnetic remanent condition, said second stable electrical condition being defined by said first cell being in a positive remanent condition and said second cell being in a negative remanent condition, said third stable electrical condition being defined by said first cell being in a negative remanent condition and said second cell being in a positive remanent condition, means for addressing all of the cells having their apertures in registry by applying a magnetomotive force of a first polarity during the reading operation and a second polarity during the writing operation.

References Cited in the file of this patent

UNITED STATES PATENTS

| | | |
|---|---|---|
| 2,784,391 | Rajchman et al. | Mar. 5, 1957 |
| 2,882,519 | Walentine et al. | Apr. 14, 1959 |